Figure 1:
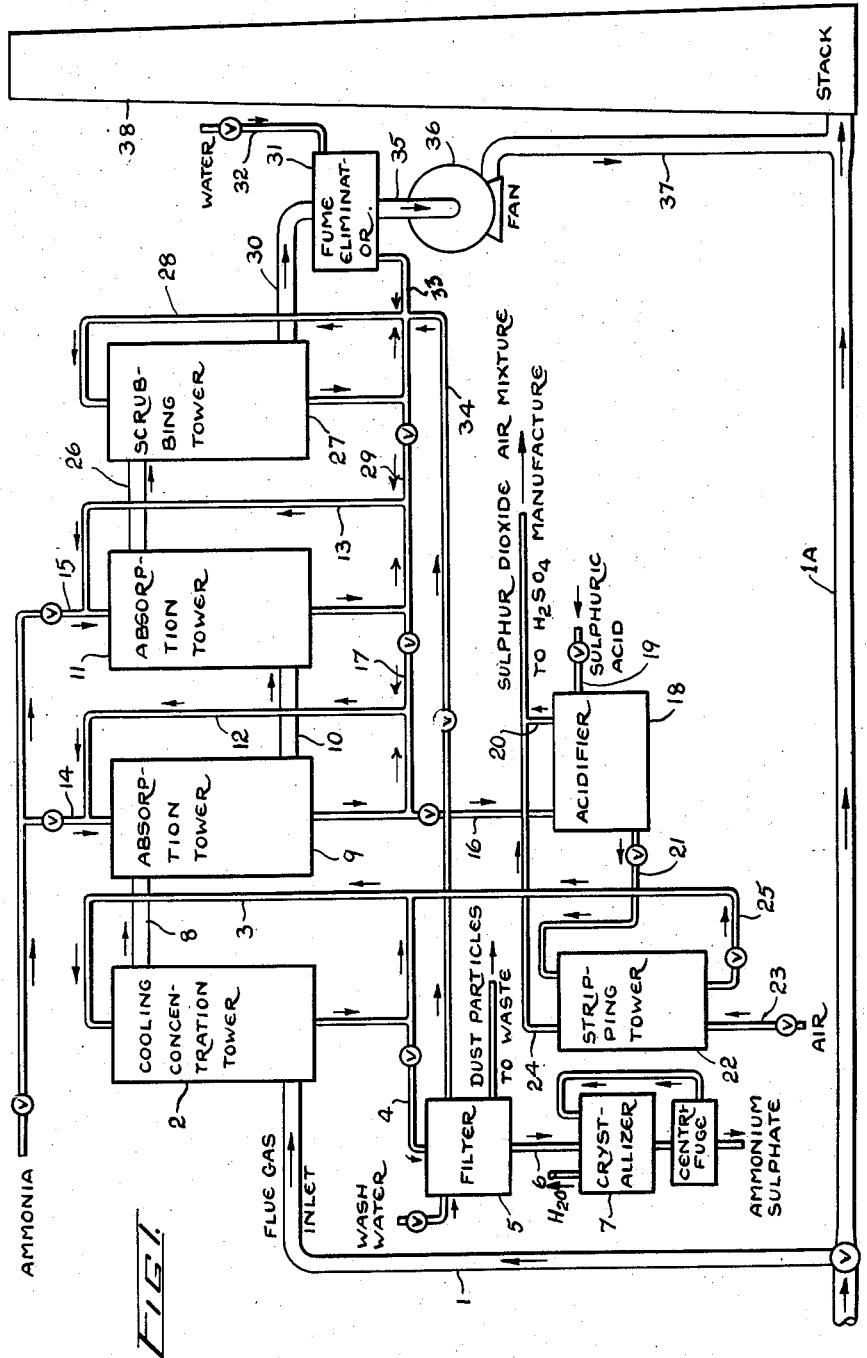

Dec. 2, 1958 W. D. BURGESS 2,862,789
TREATMENT OF FLUE GASES
Filed May 17, 1954 2 Sheets-Sheet 1

INVENTOR
WILFRED. D. BURGESS
BY
ATTORNEYS

United States Patent Office 2,862,789
Patented Dec. 2, 1958

2,862,789

TREATMENT OF FLUE GASES

Wilfred Duncan Burgess, Trail, British Columbia, Canada, assignor to Consolidated Mining and Smelting Company of Canada Limited, Montreal, Quebec, Canada, a company of Canada Application May 17, 1954, Serial No. 430,310

4 Claims. (Cl. 23—119)

This invention relates to a method of treating combustion gases which contain oxides of sulphur, such as sulphur dioxide, for the separation of oxides of sulphur and their conversion to and recovery as commercially useful chemical compounds. The method of the present invention is particularly directed to the treatment of combustion gases such as are produced in the combustion of high sulphur coal and which contain such small amounts of oxides of sulphur that they are difficult to treat economically by known methods and yet are present in amounts sufficient to pollute the atmosphere if released to the atmosphere without treatment.

It is well known that flue gases from combustion furnaces usually contain small amounts of oxides of sulphur such as sulphur dioxide. The sulphur dioxide content of flue gases from high sulphur coals may be as high as 0.5% by volume or even higher. Heretofore, disposal of combustion gases containing relatively small amounts of oxides of sulphur has presented important problems such as pollution of the atmosphere which occurs when such gases are discharged to the atmosphere. Damage is caused to vegetation, to buildings, to metal work and to equipment. In a number of countries, it is required by law to treat such noxious gases to reduce the sulphur dioxide content therein to below a certain specified value, usually of the order of 0.2% sulphur dioxide or less by volume. Such treatment has resulted in a considerable cost, particularly when the sulphur is recovered as a waste product which may raise other disposal problems.

There is, therefore, a widespread need for a commercially practical method of treating combustion gases which contain small amounts of oxides of sulphur.

A process currently employed successfully for treating industrial gases which contain sulphur dioxide is that in which the sulphur dioxide is absorbed with ammonia. Briefly, the process comprises fixing the sulphur by reaction of the sulphur dioxide with ammonia and water to form a solution of ammonium sulphites, for example, ammonium monosulphite and ammonium bisulphite, as illustrated by the reactions represented by the following equations:

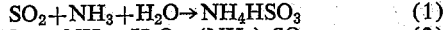
$$SO_2 + NH_3 + H_2O \rightarrow NH_4HSO_3 \quad (1)$$
$$SO_2 + 2NH_3 + H_2O \rightarrow (NH_4)_2SO_3 \quad (2)$$
$$SO_2 + (NH_4)_2SO_3 + H_2O \rightarrow 2NH_4HSO_3 \quad (3)$$

The sulphite solution produced by these reactions can be acidified with sulphuric acid to produce a solution of ammonium sulphate and pure sulphur dioxide as illustrated by the reactions represented by the following equations:

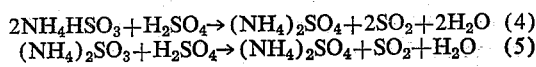
$$2NH_4HSO_3 + H_2SO_4 \rightarrow (NH_4)_2SO_4 + 2SO_2 + 2H_2O \quad (4)$$
$$(NH_4)_2SO_3 + H_2SO_4 \rightarrow (NH_4)_2SO_4 + SO_2 + H_2O \quad (5)$$

The sulphate solution can be treated by known means whereby crystalline ammonium sulphate, a marketable commodity, is recovered. Sulphur dioxide which is produced in reactions 4 and 5 can be converted to sulphuric acid, such as in a contact acid plant, which can be used in the acidification step of the process.

This sulphur dioxide absorption process is being used successfully on a commercial scale in the treatment of industrial gases such as those evolved in roasting and smelting mineral sulphide ores and concentrates. The success of this absorption process in the treatment of such gases is due, in part, to the following factors:

(a) Ammonia and sulphur dioxide losses must be kept to a minimum in order to operate the process economically. It is believed that these losses are directly proportional to (1) the vapour pressures of the respective compounds and hence the operating temperature of the process, and (2) the number of dust particles present in the gases to be treated.

(1) Because the losses increase as the operating temperature is increased, a low operating temperature, for example, about 85° F. or lower, is desirable. Gases from roasting and smelting mineral sulphide ores and concentrates usually meet this requirement as a result of the treatment involved in recovering the dust burden which, unlike flyash, is of commercial value. Also, the sulphur dioxide concentration of such gases is sufficiently high that treatment costs are economic.

(2) Losses of ammonia and sulphur dioxide are also affected by the dust burden of the gases to be treated. Dust particles act as nuclei for the reaction between ammonia and sulphur dioxide to form ammonium sulphite which condenses on the nuclei as a fume. If these fume particles are allowed to escape to the atmosphere, they carry with them reacted ammonia and sulphur dioxide to create a dense fog. Losses of ammonia and sulphur dioxide are undesirable, of course, from an economic point of view, and the fume is objectionable because of unfavourable stack appearance and atmospheric contamination. However, as smelter gases are relatively free of dust particles, losses due to this source are relatively low, thus making the absorption process economical.

(b) The sulphate solution resulting from acidification should be relatively highly concentrated in respect of ammonium sulphate in order to recover crystalline ammonium sulphate economically, but safely below the saturation point at the temperature of operation to avoid crystallization of ammonium sulphate in the conduits. A dilute ammonium sulphate solution requires excessive evaporation in the crystallizing step which adds to the cost of the process. In order to obtain a fairly concentrated ammonium sulphate solution without excessive evaporation requirements, the sulphur dioxide content of the gases to be treated must be relatively high, so that a concentrated sulphite solution is produced which, in turn, yields a concentrated sulphate solution. Smelter gases also meet this requirement as their sulphur dioxide content is high, for example, well above 1.0% by volume and often as high as 5% to 6% or more.

In applying this absorption process to the treatment of flue gases from combustion furnaces such as those evolved in the combustion of high sulphur fuel in a power plant, and identified hereinafter as "flue gases," a number of difficulties are encountered such as:

(1) The flue gases are relatively hot, for example, of the order of from about 200° F. to about 600° F. It is not too difficult or costly to cool these gases to their wet bulb temperature, for example, to about 115° F., but it is costly and impractical to cool them from the wet bulb temperature to the desirable operating temperature, about 85° F., of an ammonia absorption process due to the large volume of gas which is involved.

(2) The flue gases usually contain a heavy dust burden, such as flyash, which acts as condensation nuclei for ammonium sulphite fumes thereby causing high losses of ammonia and sulphur dioxide. The fumes also create a plume above the exhaust stack which, although not harmful itself, presents an unfavourable appearance from a public relations point of view and also from the point of view of smoke control regulations which may specify a certain maximum degree of visibility of exhaust gases.

(3) The sulphur dioxide concentration of the flue gases is low relative to that of smelter gases and as a result the sulphite solution produced according to reactions 1, 2 and 3 above would be weak and would not produce a concentrated solution of ammonium sulphate in reactions 4 and 5. As a result, large volumes of water would have to be evaporated from the ammonium sulphate solution to recover the ammonium sulphate by crystallization and the cost of the process would be increased considerably.

The difficulties which heretofore have prevented the use of the ammonia absorption process in the treatment of combustion gases which contain only relatively small amounts of oxides of sulphur are successfully overcome by the process of the present invention. Specifically, the flue gases are brought into direct contact with a dilute solution of ammonium sulphate containing sulphur dioxide and the heat of the gases is employed to evaporate water and thus concentrate the ammonium sulphate to the extent that it can be recovered economically in a later step as a commercial crystalline product by crystallization. At the same time, sulphur dioxide is stripped from the sulphate solution by the hot flue gases and the flue gases are cooled to the extent that they can be passed to an absorption system for the absorption of the sulphur dioxide with ammonia to form an ammonium monosulphite-ammonium bisulphite solution according to Reactions 1, 2 and 3 above. The ammonium monosulphite-ammonium bisulphite solution can be acidified with sulphuric acid to form sulphur dioxide and a dilute ammonium sulphate solution saturated with sulphur dioxide which is passed to the first mentioned cooling and concentrating step. Fume which condenses on dust particles, most of which are carried by the gas stream through the cooling and concentrating step and the absorption step, causes dust particles to "grow" to the extent that the fume and dust burden can be removed relatively easily in a fume eliminator installed at the end of the process. Thus, ammonia and sulphur dioxide losses are low and the flue gases are finally discharged to the atmosphere with a sulphur dioxide concentration safely below that at which there would be pollution of the atmosphere.

The process of the present invention therefore comprises, in general, the steps of bringing a stream of hot combustion gas containing oxides of sulphur into direct contact, in a cooling and concentrating step, with a cooler aqueous ammonium sulphate solution containing sulphur dioxide whereby sulphur dioxide is stripped from the solution and water is evaporated therefrom thereby increasing the ammonium sulphate concentration of the residual solution and cooling the gas, separately withdrawing concentrated ammonium sulphate solution from the cooling and concentrating step, treating a portion of withdrawn concentrated ammonium sulphate solution for the recovery of ammonium sulphate, returning the remainder of the withdrawn concentrated ammonium sulphate solution to the cooling and concentrating step, passing a mixture of cooled combustion gas, water vapour and stripped sulphur dioxide from the cooling and concentrating step to a sulphur dioxide absorption step wherein the cooled gas mixture is brought into contact with a circulating solution of ammonium sulphites containing added ammonia whereby sulphur dioxide is absorbed from the cooled combustion gas, continuously withdrawing a portion of the circulating solution from the absorption step and acidifying it with sulphuric acid whereby sulphur dioxide gas is evolved and a dilute ammonium sulphate solution saturated with sulphur dioxide is formed, separately recovering evolved sulphur dioxide gas, adding ammonium sulphate solution formed in the acidifying step to the cooling and concentrating step, and discharging cooled and treated combustion gas from the absorption step to the atmosphere.

Figure 2:
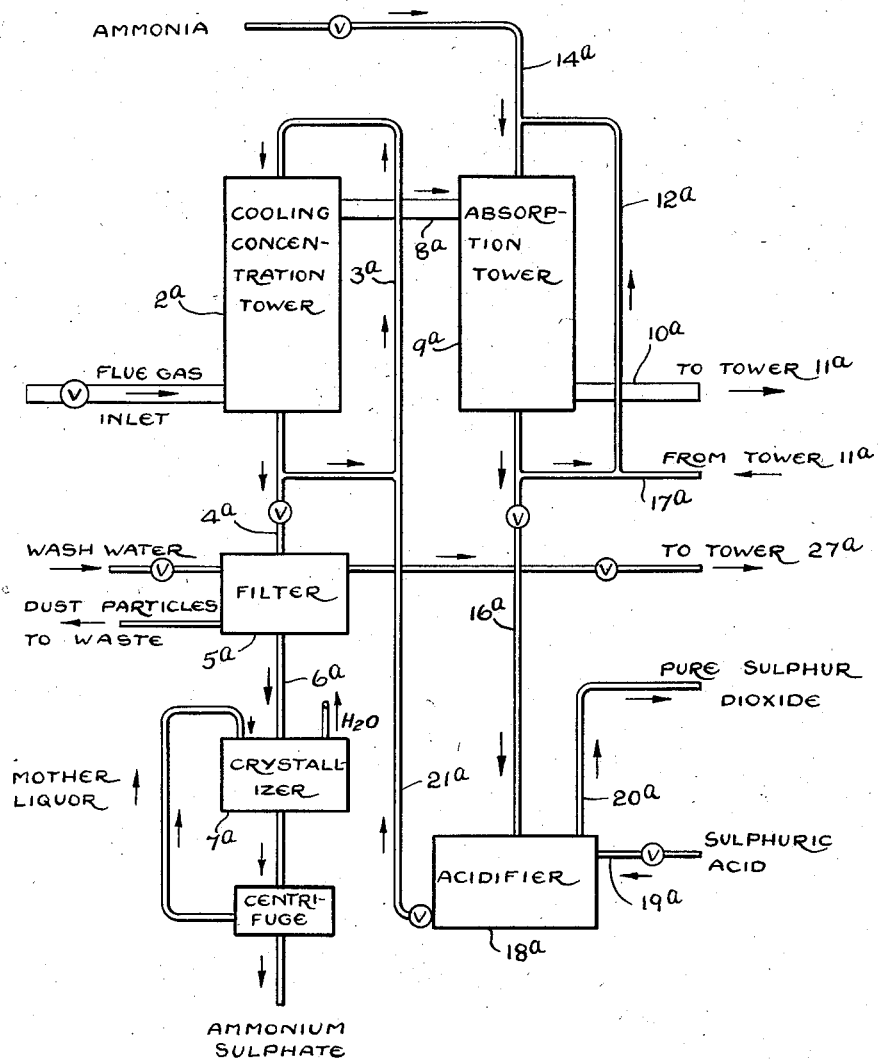

An understanding of the process and the manner in which it is operated can be obtained from the following detailed description, reference being made to the accompanying drawings, in which:

Figure 1 is a flow sheet which illustrates a preferred modification of the process; and Figure 2 is a flow sheet which illustrates an alternative modification of the process.

Like reference characters refer to like parts throughout the specification and drawings.

Referring to the modification of the invention illustrated by Figure 1, hot combustion gases from a combustion furnace, not shown, such as those evolved in the combustion of high sulphur fuel in the generation of power and which contain small amounts of oxides of sulphur are passed through a conduit 1 into a cooling and concentrating tower 2 through which circulates an aqueous ammonium sulphate solution which enters the tower through conduit 3. These flue gases may be at a temperature as high as from 200° F. to 600° F. and as they come into direct contact with the solution, they are cooled due to evaporation of water from the ammonium sulphate solution which is concentrated by the evaporation until it is almost saturated with ammonium sulphate. Dust particles, such as flyash, which have been removed from the flue gases during their passage through this and subsequent steps of the process, are accumulated in the sulphate solution and are retained therein. Sulphur dioxide contained in the sulphate solution entering the tower 2 is stripped therefrom by the flue gases to the extent that the sulphur dioxide in the solution is in equilibrium with the sulphur dioxide in the flue gases. Flue gases and ammonium sulphate solution can flow in countercurrent through tower 2, as illustrated, or they can flow concurrently as the volumes of gases and solution are large and the time of retention is relatively long. Large dust particles may be separated from the flue gases in this tower and retained in the ammonium sulphate solution but finer particles tend to pass through the system to the fume eliminator 31 where they are separated from the gases and finally report in tower 2 as described in detail hereinafter.

A portion of the concentrated circulating ammonium sulphate solution with suspended dust particles is withdrawn continuously from tower 2 through conduit 4 and is treated for the separation of solid particles, such as by filtration in filter 5. The filter cake is washed with water and discarded. The wash water can be passed to the absorption system described hereinafter. The clarified concentrated ammonium sulphate filtrate is then passed through conduit 6 to crystallizer 7 wherein crystalline ammonium sulphate is recovered by evaporation. Mother liquor is separated from the ammonium sulphate crystals, such as by means of a centrifuge, and is returned to the crystallizer 7.

Cooled flue gases at a temperature of the order of about 115° F. pass from tower 2 through conduit 8 into an absorption tower 9 and from tower 9 into an absorption tower 11. Absorbent solutions circulating in towers 9 and 11 comprise weak solutions of ammonium monosulphite and ammonium bisulphite which flow through conduits 12 and 13 to towers 9 and 11 respectively. Ammonia is added to the circulating absorbent solutions through conduits 14 and 15, preferably in amount sufficient to maintain the pH value of the solution in tower 9 within the range of from about 4.8 to about 5.8, and preferably at about 5.2, and the pH value of the solution in tower 11 is maintained within the range of from about 5.0 to about 6.0, and preferably at about 5.6. Sulphur dioxide in the flue gases flowing through these towers reacts with ammonia and water in the circulating solutions according to Reactions 1, 2 and 3 above to produce ammonium bisulphite and ammonium monosulphite. The amount of each compound produced is governed by the pH value of the circulating solution. The preferred pH ranges are optimum conditions under which the bisulphite to monosulphite ratios are such as to bring about the best sulphur dioxide recovery and the lowest ammonia loss. About 3 times as much sulphur dioxide is absorbed in tower 9 as in tower 11, resulting in a somewhat stronger circulating solution in tower 9 than in tower 11, the strength of the solution being measured in grams of sulphur dioxide per litre of solution. The desired concentrations are obtained and controlled mainly by the rate of withdrawal of the solutions from the towers which is effected through conduits 16 and 17.

A portion of the circulating solution is withdrawn from tower 9 and is passed through conduit 16 to an acidifier 18. Sulphuric acid from a suitable source of supply, not shown, is passed through conduit 19 to the acidifier 18 wherein Reactions 4 and 5 occur with the formation of sulphur dioxide and a dilute solution of ammonium sulphate saturated with sulphur dioxide. Sulphur dioxide is withdrawn from the acidifier through conduit 20 and ammonium sulphate solution is pumped through conduit 21 to the top of a stripping tower 22. Air is discharged under pressure through conduit 23 into the bottom of tower 22 and in its passage through the ammonium sulphate solution strips dissolved sulphur dioxide from the solution. About 75% to about 85% of the dissolved sulphur dioxide is stripped from the sulphate solution in this manner. A mixture of air and stripped sulphur dioxide is discharged from tower 22 through conduit 24 and joins the sulphur dioxide in conduit 20 to form a mixture suitable for the manufacture of sulphuric acid, such as in a contact acid plant. Sulphuric acid from the acid plant can be used in the acidification step of the process conducted in acidifier 18. Dilute ammonium sulphate solution is withdrawn from tower 22 through conduit 25 and joins the circulating solution in conduit 3 which extends to the cooling and concentrating tower 2.

Flue gases withdrawn from absorption tower 11 pass through conduit 26 into a tower 27 which acts as an ammonia scrubber. A circulating solution comprised of a dilute solution of ammonium sulphites flows through conduit 28 to tower 27 and flows in direct contact with the flue gases. Ammonia carried from absorption towers 9 and 11 by the flue gases is recovered in tower 27 together with sulphur dioxide by absorption in the solution. The pH value of the solution in tower 27 is maintained within the range of from about 4.8 to about 5.8, preferably at about 5.3. A portion of the circulating solution is continuously withdrawn from tower 27 through conduit 29 and passed into conduit 13 to join the solution fed to absorption tower 11. Solution from tower 11 is withdrawn as previously described through conduit 17 into conduit 12 and joins the solution fed to tower 9.

Flue gases pass from scrubbing tower 27 through conduit 30 into a fume eliminator 31. In the fume eliminator, the dust particles contained in the flue gases and ammonium sulphite fume which has condensed on the particles are scrubbed out with water which is fed to the eliminator through conduit 32. Effluent water containing dust particles is withdrawn continuously from fume eliminator 31 through conduit 33 and joins the circulating solution in conduit 28 for tower 27. The wash water from filter 5 can be added through conduit 34 to the circulating solution in conduit 28. Any sulphur trioxide contained in the flue gases is removed in the fume eliminator and forms sulphuric acid which is carried by the effluent water to the absorption system wherein the sulphuric acid and the products of autoxidation, which amount to about 10% of the sulphur dioxide recovered, are recovered as ammonium sulphate.

Cleaned flue gases leave eliminator 31 through conduit 35 and are discharged by fan 36 through conduit 37 to stack 38 and thence to the atmosphere. Sufficient hot flue gas can be by-passed, if desired, directly from conduit 1 through conduit 1A to the stack 28 wherein it is mixed with the cooled treated gases to maintain the temperature of the stack above the dew-point of the exit gases and thus keep the stack dry.

An important modification of the process is illustrated by Figure 2 wherein air is not used to strip sulphur dioxide from the ammonium sulphate solution but, rather, all stripping is done in cooling and concentrating tower 2a by the flue gases. The process illustrated by Figure 2 is essentially the same as that described above with the difference that the dilute solution of ammonium sulphate is withdrawn from acidifier 18a through conduit 21a and is pumped directly to conduit 3a wherein it joins the circulating solution to tower 2a. A further difference is that the pure sulphur dioxide withdrawn from acidifier 18a through conduit 20a need not be mixed with air. This is a particularly useful embodiment if the contact acid plant is remote from the gas treating system so that a small conduit can be used to carry undiluted sulphur dioxide instead of a large conduit as would be required for the larger volume of sulphur dioxide-air mixture produced by the modification illustrated by Figure 1. The modification illustrated by Figure 2 also is particularly advantageous if the sulphur dioxide is to be liquefied or reduced to elemental sulphur.

The operation of the process of the present invention is illustrated by the following example. Figures expressed in percent are by weight except those which apply to components of gases which are by volume. The term "hot" flue gases is intended to indicate the hot gases as they are received from a combustion furnace and may be at a temperature of, for example, from 200° F. to 600° F. The term "dilute" solution is intended to indicate a solution which is substantially less than saturated with a salt of interest as compared with a "strong" or "concentrated" solution which is only sufficiently less than saturated at the prevailing temperature as to permit free flow through conduits without danger of crystallization.

A flue gas from a combustion furnace which contains about 0.3% sulphur dioxide and a relatively heavy burden of dust particles, particularly in the form of flyash, and having a dry bulb temperature of about 240° F. and a wet bulb temperature of about 117° F. is treated by the process illustrated by Figure 1. About 100,000 cubic feet of hot gas per minute, calculated on a dry and at normal temperature and pressure basis, is passed through conduit 1 into a wood packed tower 2 wherein it is brought into direct contact with a circulating ammonium sulphate solution which flows in countercurrent to the flow of the gas. A dilute aqueous solution containing about 17.6%, about 194 grams per litre, of ammonium sulphate at a temperature of about 77° F. is continuously added to the solution circulating through tower 2.

The transfer of heat from the gas to the solution in tower 2 evaporates water from the ammonium sulphate solution and cools the gas to about its initial wet bulb temperature. The solution is concentrated to about 42% ammonium sulphate, about 520 grams per litre, and flows satisfactorily through the conduits and the filter 5 without crystallization. The ammonium sulphate is recovered economically by crystallization in the crystallizing step.

The flue gas leaves tower 2 through conduit 8 at a temperature of about 116° F., about 90% saturated with water vapour, and enters tower 9.

The concentrated ammonium sulphate solution is withdrawn, at the rate of about 127 pounds per minute, from the solution circulating through tower 2 and is passed through conduit 4 into filter 5 wherein dust particles separated from the flue gas are separated from the solution by filtration and washed with water. The wash water is returned to the process and the filter cake is discarded. The filtered ammonium sulphate solution is passed through conduit 6 to crystallizer 7 wherein about 53 pounds per minute of ammonium sulphate are produced by crystallization.

Flue gas from tower 2 passes through conduit 8 into absorption tower 9 through which passes a dilute circulating solution of ammonium sulphites, also at a temperature of about 116° F. Ammonia is added to this solution through conduit 14 and a portion of the sulphite solution withdrawn from absorption tower 11 is added through conduit 17. Sulphur dioxide in the flue gas reacts with ammonia and water in this tower according to Reactions 1, 2 and 3 above to form ammonium bisulphite and ammonium monosulphite thereby enriching the circulating solution. A portion of this circulating solution is continuously withdrawn from tower 9 at the rate of about 310 pounds per minute through conduit 16 and is pumped to acidifier 18. The pH value of the solution in tower 9 is maintained within the range of from about 4.8 to about 5.8 and preferably at about 5.2 by the addition of ammonia at the rate of about 10.5 pounds per minute. The sulphur dioxide concentration is maintained at about 152 grams per litre by regulating the rate of withdrawal of solution from tower 9 through conduit 16.

About 35 pounds of 93% sulphuric acid is added per minute to acidifier 18 through conduit 19. About 39 pounds per minute of sulphur dioxide and a solution containing about 17.4% ammonium sulphate are produced by the reaction between the sulphuric acid and the ammonium sulphites in the solution from tower 9. Sulphur dioxide, 90% saturated with water vapour, is removed from acidifier 18 through conduit 20 and is recovered. Sulphate solution is continuously withdrawn from the acidifier and pumped through conduit 21 to stripper 22 at the rate of about 306 pounds per minute.

Ammonium sulphate solution enters stripper 22 at a temperature of about 97° F. and saturated with sulphur dioxide. About 1600 cubic feet per minute of atmospheric air at about 60° F. is forced through the stripper and strips from about 75% to about 85% of the sulphur dioxide from the solution. The mixture of air and sulphur dioxide, about 90% saturated with water vapour, is withdrawn from the stripper and joins the stream of sulphur dioxide withdrawn from the preceding acidification step to produce a sulphur dioxide-air mixture containing about 12% sulphur dioxide and about 18% oxygen. This gas mixture is passed to a contact acid plant for conversion to sulphuric acid. Ammonium sulphate solution is withdrawn from stripping tower 22 at the rate of about 302 pounds per minute and at a temperature of about 77° F. This solution has an ammonium sulphate concentration of about 17.6% and is pumped through conduit 25 to tower 2 wherein it is concentrated as described above and most of the remaining dissolved sulphur dioxide is stripped therefrom by the flue gas.

The flue gas withdrawn from tower 9 passes through conduit 10 into tower 11, still at a temperature of about 116° F. which is maintained throughout the absorption and scrubbing systems. A dilute ammonium sulphite solution also at a temperature of about 116° F. is circulated through tower 11. Ammonia is added to this solution through conduit 15 and also a portion of the solution from scrubbing tower 27 through conduit 29. As in tower 9, sulphur dioxide, ammonia and water react to form ammonium bisulphite and ammonium monosulphite according to Reactions 1, 2 and 3 above. A portion of this circulating solution is continuously withdrawn from tower 11 at the rate of about 290 pounds per minute through conduit 17 and is pumped to tower 9 with the circulating solution passing through conduit 12. The pH value of the solution in tower 11 is maintained within the range of from about 5.0 to about 6.0, and preferably at about 5.6 by the addition of ammonia at the rate of about 3.5 pounds per minute. The sulphur dioxide concentration is maintained at about 100 grams per litre by regulating the rate of withdrawal of solution from tower 11 through conduit 17.

Flue gas from tower 11 passes through conduit 26 into tower 27 through which flows a dilute circulating solution of ammonium sulphites at a temperature of about 116° F. No ammonia is added to this solution, but a solution comprising the effluent water from fume eliminator 31 and wash water from filter 5 is added through conduits 33 and 34. Ammonia entrained by the flue gas in the preceding absorption step is recovered by reaction with water and with sulphur dioxide remaining in the flue gas to form ammonium sulphites. A portion of the circulating solution is continuously withdrawn at the rate of about 270 pounds per minute through conduit 29 and is pumped to tower 11 with the circulating solution passing through conduit 13. The pH value of the solution in tower 27 is maintained within the range of from about 4.8 to about 5.8, and preferably at about 5.3. The sulphur dioxide concentration is maintained at about 40 grams per litre by regulating the rate of withdrawal of solution from tower 27 through conduit 29.

The flue gas from tower 27 is passed through conduit 30 into fume eliminator 31 to which about 310 pounds of water are added per minute through conduit 32. Dust and fume particles from the flue gas are removed from the gas in the eliminator. Insoluble material, for example, dust particles such as fly ash, is carried in suspension by the various solutions in their passage through the process to filter 5 where it is removed, washed and discarded. The fume, which consists principally of ammonium sulphites but which possibly also contains ammonium bisulphate and sulphate, is soluble in the absorbent solution and is recovered as sulphate in the acidification step. Effluent water from the eliminator is withdrawn continuously and together with wash water from filter 5 is pumped at the rate of about 250 pounds per minute to tower 27 with the circulating solution passing through conduit 28.

The flue gas, about 100% saturated with water vapour, is discharged from the eliminator at a temperature of about 116° F. and under a negative pressure of about 12 inches' water gauge. This gas is exhausted by fan 36 and passed through conduit 37 to the base of the stack and thence through the stack to the atmosphere. Sufficient hot, untreated flue gas, amounting to about 10% of the gas treated, is added to the cooled wet gas through by-pass conduit 1A, to maintain the temperature of the combined gas stream above its dew-point and thus prevent condensation of moisture in the stack. The exact amount of by-passed gas depends, of course, on atmospheric conditions and on the extent of dryness desired and can be adjusted very easily to suit specific conditions.

In operating the process in the manner described above, the recovery of sulphur dioxide from the flue gas treated is of the order of about 80% of the total sulphur dioxide contained in the gas passed through the system, resulting in an overall recovery of about 73%. The stack emission contains about 0.08% sulphur dioxide by volume. The loss of ammonia is of the order of about 2%. Crystalline ammonium sulphate is recovered from crystallizer 7 at the rate of about 53 pounds per minute and sulphur dioxide is produced at the rate of about 39 pounds per minute.

In the above example, the solution circulation in towers 2, 9, 11 and 27 is of the order of about 24,000 pounds per minute. Towers about 22 feet square and about 30 feet high with 15 feet of wood packing are adequate for this circulation and the volume of gas handled. The towers are of wood construction and are of conventional design for the purposes described and can be lead lined to minimize corrosion. Substantial savings in materials of construction can be effected by eliminating conduits 8, 10 and 26 and by placing together the four towers in series as a single unit with openings in the walls to replace the conduits. Further savings can be effected by constructing two single units as a double unit operating in parallel.

In the foregoing example, the fume eliminator is a wet scrubber but other types of efficient dust collectors, for example wet electrostatic precipitators, are also satisfactory.

The process has a number of important advantages. An important advantage is the relatively high sulphur recovery and low ammonia loss which is very surprising considering the huge volume and low sulphur dioxide concentration of the gas handled. The process operates at substantially atmospheric pressure which permits the use of inexpensive low pressure vessels. No external cooling is required as the process is conducted at a relatively high operating temperature. Important economic savings are made by utilizing waste heat in the flue gas for concentrating a dilute solution of ammonium sulphate which otherwise would be costly to treat for the recovery of the salt in crystalline form. A further advantage is that the amount of gas treated can be adjusted to meet local requirements and economic conditions. For example, it may be possible by treating only about 50% of the flue gas produced to reduce the sulphur dioxide content of the combined treated and untreated exit gases to a concentration acceptable to local authorities. In addition to these advantages, the stack emission is relatively free of fume and presents a favourable appearance to the public.

What I claim as new and desire to protect by Letters Patent of the United States is:

1. In a process for treating hot combustion gas which contains a finite amount but less than about 1% of sulphur dioxide in which sulphur dioxide is absorbed from the gas in an absorption step with a solution of ammonium sulphites which contains added ammonia and in which absorbent solution is withdrawn from the absorption step and acidified in an acidification step with sulphuric acid thereby releasing sulphur dioxide gas and forming an ammonium sulphate solution which contains dissolved sulphur dioxide, the improvement which comprises the steps of passing, in a cooling step, said hot combustion gas at an initial temperature above about 200° F. in direct contact with an aqueous, essentially ammonium sulphate solution at a temperature below 200° F. which contains dissolved sulphur dioxide whereby said hot combustion gas is cooled to a temperature below 200° F. and the sulphur dioxide and water vapour contents thereof are augmented and the concentration of ammonium sulphate in said aqueous essentially ammonium sulphate solution is increased; continuously withdrawing concentrated ammonium sulphate solution from said cooling step; treating part of said withdrawn ammonium sulphate solution to recover crystalline ammonium sulphate therefrom; circulating the remainder of said withdrawn ammonium sulphate solution to said cooling step for direct contact therein with hot combustion gas; passing cooled combustion gas from the cooling step to the absorption step wherein sulphur dioxide is absorbed in a dilute solution of ammonium sulphites; discharging cooled combustion gas substantially free from sulphur dioxide from the absorption step to the atmosphere; withdrawing dilute solution of ammonium sulphites from the absorption step; acidifying said withdrawn solution of ammonium sulphites with sulphuric acid thereby releasing sulphur dioxide gas and forming dilute ammonium sulphate solution which contains dissolved sulphur dioxide; recovering said released sulphur dioxide gas; and passing said dilute ammonium sulphate solution which contains dissolved sulphur dioxide to said cooling step for direct contact therein with hot combustion gas.

2. The process of treating hot, sulphur dioxide containing combustion gas according to claim 1 in which hot, untreated combustion gas is mixed with cooled treated combustion gas prior to discharge of the cooled treated gas to the atmosphere.

3. The process of treating hot, sulphur dioxide containing combustion gas according to claim 1 in which ammonia is recovered from the cooled gas mixture from the sulphur dioxide absorption step in an ammonia recovery step by scrubbing the cooled gas mixture with a solution of ammonium sulphites, said solution of ammonium sulphites is continuously withdrawn from the ammonia recovery step and a portion thereof is passed to the sulphur dioxide absorption step and the remainder thereof is recycled to the ammonia recovery step, water is added to the ammonia recovery step, cooled combustion gas substantially free from sulphur dioxide is withdrawn from the ammonia recovery step, and suspended solid particles are separated therefrom prior to the discharge of the gas to the atmosphere.

4. In a process for treating hot combustion gas which contains a finite amount but less than about 1% of sulphur dioxide in which sulphur dioxide is absorped from the gas in an absorption step with a solution of ammonium sulphites which contains added ammonia and in which absorbent solution is withdrawn from the absorption step and acidified in an acidification step with sulphuric acid thereby releasing sulphur dioxide gas and forming an ammonium sulphate solution which contains dissolved sulphur dioxide, the improvement which comprises the steps of passing, in a cooling step, said hot combustion gas at a temperature above about 200° F. in direct contact with an aqueous, essentially ammonium sulphate solution which contains dissolved sulphur dioxide whereby said hot combustion gas is cooled and the sulphur dioxide and water vapour contents thereof are augmented and the concentration of ammonium sulphate in said aqueous, essentially ammonium sulphate solution is increased; continuously withdrawing concentrated ammonium sulphate solution from said cooling step; treating part of said withdrawn ammonium sulphate solution to recover crystalline ammonium sulphate therefrom; circulating the remainder of said withdrawn ammonium sulphate solution to said cooling step for direct contact therein with hot combustion gas; passing cooled combustion gas from the cooling step to the absorption step wherein sulphur dioxide is absorbed in a dilute solution of ammonium sulphites; withdrawing dilute solution of ammonium sulphites from the absorption step; acidifying said withdrawn solution of ammonium sulphites with sulphuric acid thereby releasing sulphur dioxide gas and forming dilute ammonium sulphate solution which contains dissolved sulphur dioxide; recovering said released sulphur dioxide gas; passing said dilute ammonium sulphate solution which contains dissolved sulphur dioxide to said cooling step for direct contact therein with hot combustion gas; passing cooled combustion gas from the sulphur dioxide absorption step to an ammonia recovery step wherein it is scrubbed with a circulating solution of ammonium sulphites; continuously withdrawing a solution of ammonium sulphites from the ammonia recovery step and passing a portion thereof to the sulphur dioxide absorption step and returning the remainder thereof to the ammonia recovery step; cleaning the cooled and treated combustion gas from the ammonia recovery step by contact with water to separate solid particles therefrom; discharging cooled and treated combustion gas from the cleaning step to the atmosphere; withdrawing a mixture of water and suspended solid particles from the cleaning step and passing it to the ammonia recovery step; and passing solid particles separated from the combustion gas in sequence to and through the ammonia recovery step, the sulphur dioxide absorption step, the acidification step and the cooling step in suspension in the respective solutions circulating in those steps; and finally separating solid particles from the part of the ammonium sulphate solution withdrawn from the cooling step prior to the recovery therefrom of ammonium sulphate.

References Cited in the file of this patent

UNITED STATES PATENTS

| | | |
|---|---|---|
| 1,769,938 | Benner | July 8, 1930 |
| 1,931,408 | Hodsman | Oct. 17, 1933 |
| 1,986,889 | Fulton | Jan. 8, 1935 |
| 2,021,558 | Lee | Nov. 19, 1935 |
| 2,035,920 | Pyzel | Mar. 31, 1936 |
| 2,095,074 | Muus | Oct. 5, 1937 |
| 2,375,922 | Jermiassen | May 15, 1945 |
| 2,676,090 | Johnstone | Apr. 20, 1954 |